(12) United States Patent
Lee et al.

(10) Patent No.: US 10,250,658 B2
(45) Date of Patent: Apr. 2, 2019

(54) HYBRID MEDIA STREAM DELIVERY USING MULTIPLE NETWORK CONNECTIONS

(71) Applicant: The DIRECTV Group, Inc., El Segundo, CA (US)

(72) Inventors: Sean S. Lee, Potomac, MD (US); Phillip T. Wang, North Potomac, MD (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 0 days.

(21) Appl. No.: 15/462,761

(22) Filed: Mar. 17, 2017

(65) Prior Publication Data

US 2018/0270284 A1 Sep. 20, 2018

(51) Int. Cl.
*H04L 12/721* (2013.01)
*H04L 29/06* (2006.01)
*H04L 12/823* (2013.01)
*H04L 12/707* (2013.01)
*H04L 12/733* (2013.01)

(52) U.S. Cl.
CPC ............ *H04L 65/601* (2013.01); *H04L 45/12* (2013.01); *H04L 45/20* (2013.01); *H04L 45/22* (2013.01); *H04L 47/32* (2013.01); *H04L 69/16* (2013.01)

(58) Field of Classification Search
CPC ............ G01C 21/3453; G01C 21/3446; G01C 21/3461; H04L 45/12; H04L 45/20; H04L 45/22
See application file for complete search history.

(56) References Cited

U.S. PATENT DOCUMENTS 6,078,946 A * 6/2000 Johnson .............. H04L 41/0806
709/200
7,546,141 B2 6/2009 Leon et al.
(Continued)

FOREIGN PATENT DOCUMENTS

EP 1113620 A1 7/2001

OTHER PUBLICATIONS

Boriboon et al., "Optimized Routing Protocol for Broadband Hybrid Satellite Constellation Communication IP Network System", EURASIP Journal on Wireless Communications and Networking, 2016, 2016:120, 11 pages.

*Primary Examiner* — Raj Jain
(74) *Attorney, Agent, or Firm* — Haynes and Boone, LLP

(57) ABSTRACT

Example methods, systems, and machine-readable mediums to facilitate a hybrid media stream delivery using multiple network connections are disclosed. An example method may include receiving, from a destination device, a request for data to be delivered to the destination device over one of a network pathway or a satellite pathway. The method may further include determining a first cost of transmission of the data over the network pathway to the destination device and determining a second cost of transmission of the data over the satellite pathway to the destination device. The method may then determine a least costly pathway for transmission of the data between the network pathway and the satellite pathway using the first cost and the second cost and transmit the data over the least costly pathway of the network pathway and the satellite pathway to the destination device.

20 Claims, 6 Drawing Sheets

(56) References Cited

U.S. PATENT DOCUMENTS

| | | |
|---|---|---|
| 8,131,256 B2 | 3/2012 | Martti et al. |
| 8,194,595 B2 | 6/2012 | Kubler et al. |
| 8,249,585 B2 | 8/2012 | Tronc et al. |
| 8,340,094 B2 | 12/2012 | Clack et al. |
| 8,532,121 B2 | 9/2013 | Bennett |
| 8,713,178 B2 | 4/2014 | Pfeffer |
| 8,718,478 B2 | 5/2014 | Thelen et al. |
| 9,001,787 B1 | 4/2015 | Conant et al. |
| 9,406,252 B2 | 8/2016 | Bennett |
| 2004/0052239 A1* | 3/2004 | Nesbitt ............. G01C 21/3446 370/349 |
| 2009/0129316 A1* | 5/2009 | Ramanathan ......... H04L 45/123 370/328 |
| 2011/0295956 A1* | 12/2011 | Pechanec ........... G06Q 30/0206 709/206 |
| 2013/0091212 A1 | 4/2013 | Rajakarunanayake |

* cited by examiner

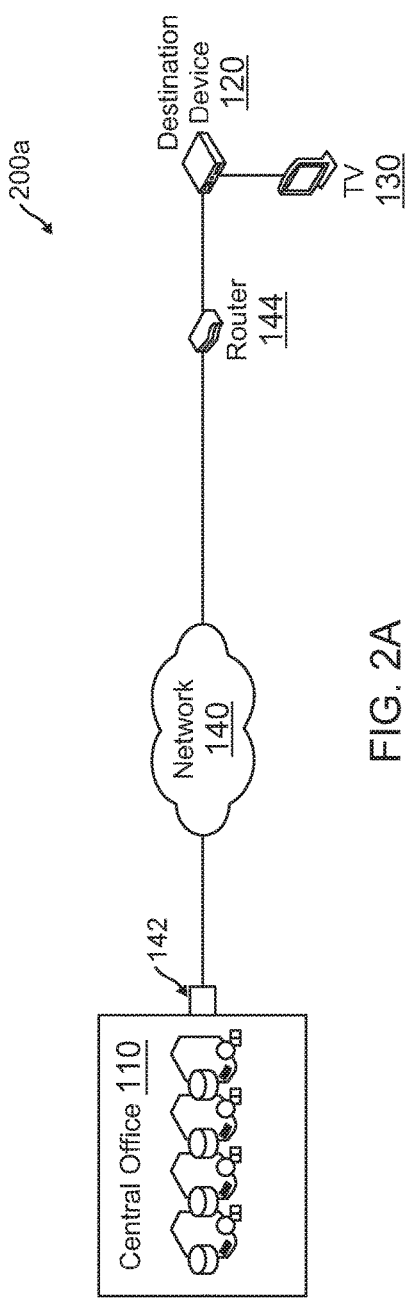
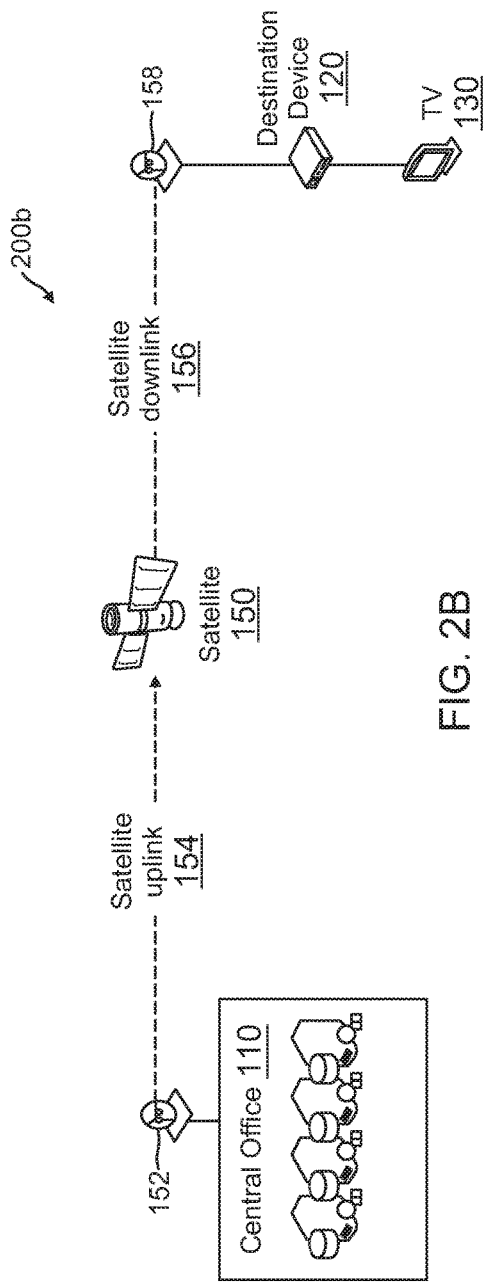

HYBRID MEDIA STREAM DELIVERY USING MULTIPLE NETWORK CONNECTIONS

FIELD OF THE DISCLOSURE

This disclosure relates generally to streaming of media content and, more particularly, to a hybrid media stream delivery using multiple network connections.

BACKGROUND

Media content streams are prevalent today, whether they are delivered to televisions, computing systems, mobile devices, gaming stations, or other types of media playback devices. The media content is generally held by an originating source, such as a central office that transmits the media content. Modernly, the media content is generally transmitted over a network, such as the Internet but may also be transmitted over other types of pathways. Generally, the media originating central offices transmit media content over unicast streams to provide user endpoints with control over media content. This causes many different unicast media streams. For example, N unicast streams must be established for N devices requesting to transmit the same media content. To minimize the load on the network due to the transmission of the media to numerous requesting media playback devices, a single multicast streams may be generated and transmitted for retrieval by users through their devices. The media originating central office can, based on the different costs associated with the different types of transmission pathways, determine a more optimal transmission pathway to transmit the media.

SUMMARY

In one or more embodiments, a method for selection of transmission pathways and switching of pathways for media streams includes receiving, from a destination device, a request for data to be delivered to the destination device over one of a network pathway or a satellite pathway. The method further includes determining a first cost of transmission of the data over the network pathway to the destination device and determining a second cost of transmission of the data over the satellite pathway to the destination device. The method may then determine a least costly pathway for transmission of the data between the network pathway and the satellite pathway using the first cost and the second cost and transmit the data over the least costly pathway of the network pathway and the satellite pathway to the destination device.

In one or more embodiments, a system for selection of transmission pathways and switching of pathways for media streams includes a non-transitory memory and one or more hardware processors coupled to the non-transitory memory and configured to read instructions from the non-transitory memory to cause the system to perform operations that include first determining a first score for transmission of media content over a network pathway to a destination device by a central office and determining a second score for transmission of the media over the satellite pathway to the destination device. The operations may then include comparing the first score to the second score for transmission of the media content over one of the network pathway or the satellite pathway and transmitting the media content over the one of the network pathway or the satellite pathway to the destination device based on the comparing.

In one or more embodiments, a non-transitory machine-readable medium having stored thereon machine-readable instructions executable to cause the computer system to perform operations including receiving, from at least one destination device, a display request for media content. In response, the operations may further include determining a first cost of transmission of the media content over a network pathway to the at least one destination device and determining a second cost of transmission of the media content over a satellite pathway to the at least one destination device. Next, the operations may include determining a lowest cost for transmission of the media content to the at least one destination device over one of the network pathway or the satellite pathway using the first cost and the second cost and transmitting the media content over the lowest cost for transmission over the one of the network pathway or the satellite pathway to the destination device.

Thus, using various embodiments, media content may be streamed more efficiently and with a lower cost (e.g., lower monetary, lower network bandwidth usage, lower satellite capacity usage, lower latency, and/or lower transmission pathway resource usage) to an originating source, such as a central office broadcasting or streaming one or more media contents to end users. The cost may be related to resource usage (e.g., bandwidth, capacity, etc.) or may be related to expenditures of value to the originating source of the media content. The cost may also be dependent on scoring each pathway, for example, which pathway may perform the best, require the least resources or value expenditure, and/or be the most efficient during streaming and transportation of media content to user endpoints.

The cost may be determined using factors including the number of destination devices requesting the media stream, an amount of data transferred by the originating source/central office, latency statistics for a network pathway, packet loss statistics for the network pathway, size of the media content, bandwidth required for the media stream, available satellites for transmission on a satellite pathway, available satellite capacity for the satellite pathway, and/or priority of the data on the satellite pathway. The cost may utilize one or more of these factors to determine a cost or score for each available pathway to stream or transmit media content to user endpoints. Each factor may be weighed the same or differently in the calculation, depending on the requirements, resource availability, and/or available value of the originating source of the media content.

Using the cost information determined by the originating source, a choice may be made to stream the media content over a network pathway, a satellite pathway, or another available transmission pathway to the originating source of the media content. During transmission of the media stream, the originating source may also switch between transmission pathways, for example, where the cost is lower or more beneficial to the originating source on another pathway than the one currently used for the media stream. The originating source may switch pathways based on analysis of the cost during the media stream transmission and/or a score calculation, and a device at or nearby the user endpoint may resolve switching of the pathways for the media stream by removing media content data packets from transport packet containers and repackaging the media content data into data packets that match the initial stream. This causes data packets of the media stream to be indistinguishable when switched between pathways to the receiving device of the media stream.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 2A is a block diagram of an exemplary network pathway for transmission of a media content stream from an originating source, according to an embodiment;

FIG. 2B is a block diagram of an exemplary satellite pathway for transmission of a media content stream from an originating source, according to an embodiment;

Figure 1:
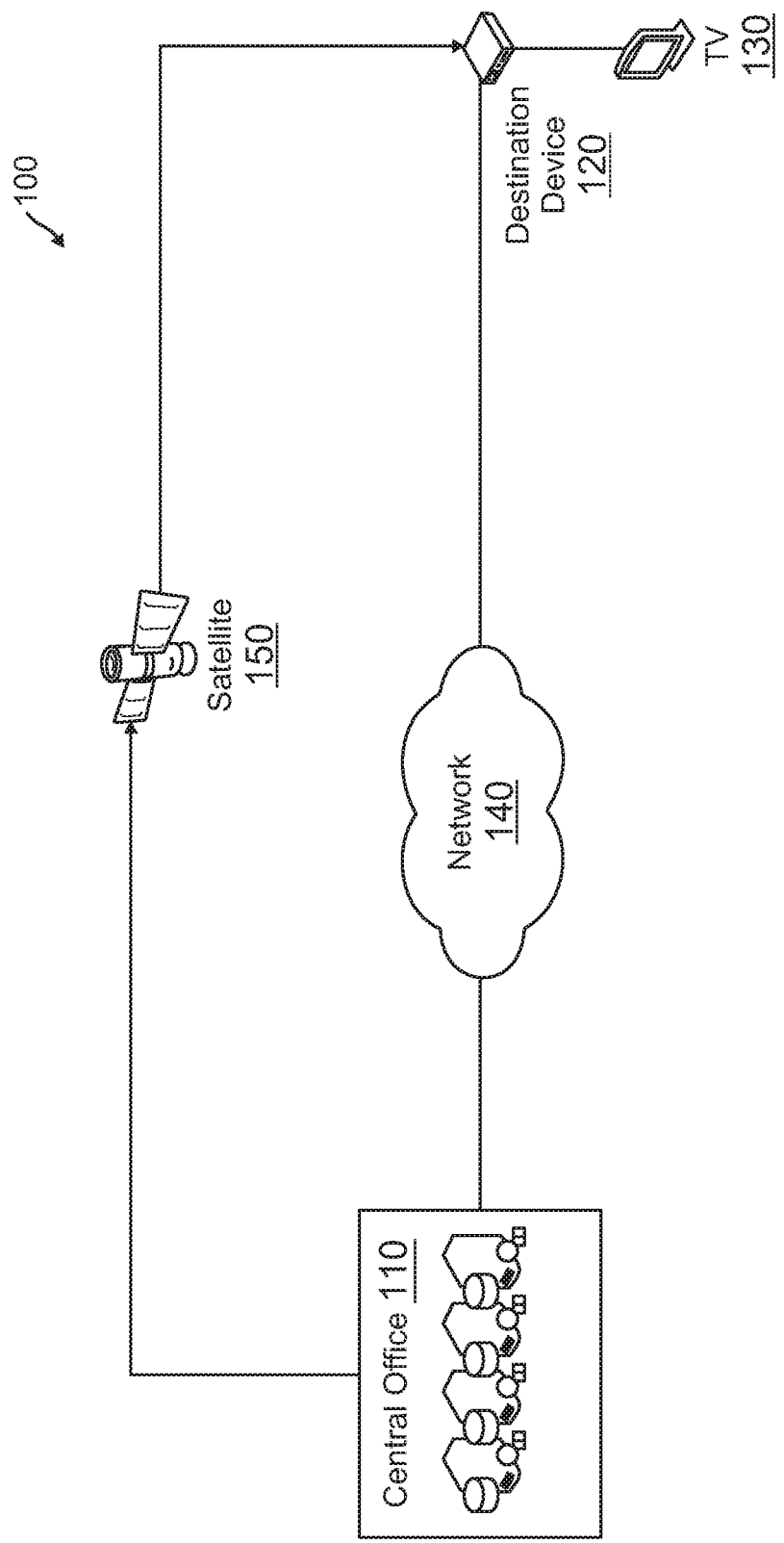
FIG. 1 is a block diagram of a communication transmission system suitable for implementing the processes and features described herein, according to an embodiment.

Embodiments of the present disclosure and their advantages are best understood by referring to the detailed description that follows. It should be appreciated that like reference numerals are used to identify like elements illustrated in one or more of the figures, where showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided for a hybrid media stream delivery using multiple network connections. Media content as used herein may refer to digital content, data, or information that may be transmitted over an electronic transmission pathway to one or more devices for presentation or playback to a user or user device. Media content may therefore include audio, visual, and/or audiovisual content including music, images, videos, recorded videos, live videos, and other types of displayable data. Media content may come from an originating point or source, such as a central broadcasting office storing or creating the media content and transmitting the media content over a transmission pathway to one or more devices for presentation and/or playback to users. Thus, such users viewing the data may be referred to herein as user endpoints, which may view the data on devices at the user endpoint including televisions, mobile devices, personal computers and tablets, gaming devices, and other types of devices capable of displaying or presenting received content and data. In this regard, media content streams, or media streams, may correspond to the transmission of the media content to these user endpoints by the originating source over one or more transmission pathways, which may be selected and switched between as discussed herein.

Such media streams may be unicast in nature, where a one-to-one connection and transmission pathway is established between the originating source and the device at the user endpoint. In such embodiments, every device requesting the media content has its own stream established between the device at the user endpoint and the originating source of the media content in the media stream. Thus, N devices will have N media streams created and managed by the originating source. In other embodiments, the originating source may establish one or more multicast streams, where the media stream is transmitted to a network node, such as an IP address of a device or server, which then transmits the data to requesting devices at user endpoints. Unicast and/or multicast media streams may function similarly during transmission of the media content over one or more pathways based on a determined cost or score, as discussed herein. In this regard, cost determination of a media stream and selection of transmission pathway, as well as switching between transmission pathways, may be performed for unicast or multicast streams similarly using the processes and features discussed herein.

A network pathway may correspond to a data transmission pathway, medium, connection, or other transmission process to transmit data over a network of wired and wireless devices, servers, and other transceivers capable of exchanging data. In various embodiments, a network or the network pathway may correspond to the Internet, where data may be transmitted along one or more connections between network nodes (e.g., devices, servers, and other redistribution point or data endpoint). Thus, the network pathway may transmit media content in a media stream over a network of devices to the user endpoint A satellite pathway may correspond to a data transmission pathway utilizing satellites and satellite connection points to upload data to a satellite for distribution to a satellite endpoint, dish, or receiver for transmission to a device at a user endpoint. Thus, the satellite pathway may transmit media content in a media stream through a satellite, where the media stream may be transmitted along a satellite uplink by a satellite uplink device (e.g., a satellite dish) to an orbiting satellite and through a satellite downlink to a receiving satellite downlink device (e.g., a user satellite dish or a satellite dish for a group of users). Other types of media transmission pathways may also be utilized by an originating device, which may be specific to the originating device including smaller networks than the Internet and/or closed networks and other data transmission mediums.

Thus, the processes and features described herein may be used to determine a pathway to transmit media content from an originating source to a device at a user endpoint through a media stream. The processes and features may also determine and switch pathways for a transmitting media stream, thus resulting in a hybrid media stream that is transmitted along multiple pathways. In this regard, an originating source, such as a central office broadcasting and/or transmitting media content for display to user endpoints, may receive a request for media content. The originating source may correspond to a system of servers and/or devices for a broadcasting entity having multiple media contents, or may correspond to smaller systems and/or single devices/servers for one or more different media contents. The request may be generated from a user at the user endpoint utilizing a device to request media content, for example, switching to a channel, requesting a video-on-demand (VOD) of media content, accessing a website or other online resource having the media content and requesting playback through the website and associated playback services/applications, requesting the media content through a device application, such as a dedicated application of the originating source, or otherwise accessing media content from the originating source and requesting that the originating source transmit the media content to the device at the user endpoint for playback and/or display. Once the request is received, the originating source may access stored data for the media content and prepare the media content for streaming and delivery to the device at the user endpoint.

The originating source may also calculate or determine a cost for transmission of the media stream along two or more pathways, including the network pathway and the satellite pathway. The cost may also correspond to a score or another quantifying calculation that determines relative value of transmitting the media stream along the pathways or otherwise compares the value, cost, efficiency, or used resources for transmitting the media stream along the pathways. For example, the cost or score may consider monetary value or expenditure, network bandwidth usage, satellite capacity usage, used or consumed transmission pathway resources, and/or other metric of value usage or expenditure to the originating source for streaming of the media content to the user endpoint. The cost may be related to resource usage (e.g., bandwidth, capacity, etc.) or may be related to expenditures of value to the originating source of the media content. The cost may also be dependent on scoring each pathway, for example, which pathway may perform the best, require the least resources or value expenditure, and/or be the most efficient during streaming and transportation of media content to user endpoints.

The cost determination/score of the pathways may be determined using factors including the number of destination devices requesting the media stream, an amount of data transferred by the originating source/central office, latency statistics for a network pathway, packet loss statistics for the network pathway, size of the media content, bandwidth required for the media stream, available satellites for transmission on a satellite pathway, available satellite capacity for the satellite pathway, and/or priority of the data on the satellite pathway. The originating source may utilize one or more of these factors into a determination of a cost or score for each available pathway for the media stream. The cost determination/scoring may consider each factor equally, or the factors may be weighted, for example, depending on the requirements, resource availability, and/or available value of the originating source of the media content. Using the cost information determined by the originating source, a choice may be made to stream the media content over a network pathway, a satellite pathway, or another available transmission pathway to the originating source of the media content.

As a simple example utilizing the number of devices requesting the media content as the sole determining factor, the originating device may determine that a network pathway is best for transmission of the media stream when only one or a small number of devices are requesting the media content. Conversely, where a large number of devices are requesting the media content (e.g., one hundred thousand to one million or more), the satellite pathway may be selected. Thus, the cost determination and/or scoring may also be determined for multiple devices at user endpoints requesting the same or different media content, where the factors affecting the cost/score for each device may be affected by the devices requesting the same and/or different media content (e.g., bandwidth usage, satellite capacity usage, etc.). In this regard, multiple devices in close geographic proximity that request the same media content may affect each other's cost/score determination and/or selection of transmission pathway. For example, if multiple devices are requesting the same media content (e.g., a million devices), the satellite pathway may be selected for an initial single uplink and distribution from the satellite along satellite downlinks to individual users, or the cost determination/score of the satellite pathway factor that considers the number of requesting device may favor (e.g., be more beneficial in the calculation, whether higher, lower, or weighted better) for the satellite pathway over the network pathway. Moreover, the media content may be transmitted over the satellite pathway to a network node closer to the device requesting the media content, which may then distribute the media content accordingly. Similarly, if the multiple devices are geographically separate and requesting the same media content, or multiple devices in close geographical proximity are requesting different content, cost determination/scoring of transmission along the network pathway and/or the satellite pathway of the media content may be performed by weighing such factors, as discussed herein. Thus, transmission of unicast media streams along the network pathway to each device at the user endpoint may be selected or the factor for the number of devices in the cost determination/scoring may favor the network pathway.

Additionally, the media streams may be "hybrid" in nature where the media streams utilize multiple pathways, for example, when switching between a network pathway and a satellite pathway, as discussed herein. Thus, a hybrid media stream may refer to a media stream transmitted over and/or switched between multiple pathways so that data packets of the media stream are transmitted over more than one pathway to a receiving device, whether that be the device at the user endpoint in the case of a unicast stream, or a target network node/IP address for a device/service for a multicast stream. In this regard, the originating device may continuously, intermittently, or periodically determine the cost and/or calculate the score for transmitting the media stream down each of the available pathways. Where it becomes less costly, more efficient, a scored difference, or otherwise more beneficial to choose one pathway over the other, then the originating source may switch to the more beneficial pathway and begin transmitting the media stream to the device at the user endpoint over the newly selected pathway. For example, if the users viewing a channel or other media stream decrease from one million to only a handful (e.g., ten thousand), it may be more beneficial to transmit the media stream over the network pathway instead of using valuable satellite pathway resources that are limited. Conversely, where many users begin requesting a media stream on their devices, it may be better to begin transmitting the media stream over the satellite pathway instead of the network pathway. The determination of cost and/or score to switch between the pathways may include factors described above similar to choosing the initial pathway. Additional weight may be given to costs of switching between pathways and/or potential of packet loss or other communication breakdown when switching pathways.

Thus, during transmission of the media stream, the originating source may switch between transmission pathways, for example, where the cost is lower or more beneficial to the originating source on another pathway than the one currently used for the media stream. The originating source may switch pathways multiple times based on analysis of the cost during the media stream and/or a score calculation during transmission of requested media content. In order to prevent packet loss and/or stream interruption, the originating source may transmit over both pathways at once to the device at the user endpoint for a limited amount of time, thus providing the data packet over both pathways to minimize potential loss during the switch. The originating source may select the amount of time to transmit over both pathways based on network statistics, including packet loss and/or latency, as well as number of network hops/redistribution nodes and/or length of network travel.

A destination device that provides the media content to a viewing device (e.g., the device at the user endpoint, such as a television transceiver box) or another device (e.g., a home gateway device at or nearby the user endpoint and/or destination device) may resolve switching of the pathways for the media stream by removing media content data packets from transport packet containers and repackaging the media content data payload into data packets that match the initial stream. This causes data packets of the media stream to be indistinguishable when output by the destination device or to the destination device (e.g., by the home gateway device) when switched between pathways, and prevents interruptions of the stream by switching between media streams and identifying new media stream data packet parameters. Thus, the user endpoint may be provided with seamless output of media content when transitions between pathways occur.

In order to provide the seamless output, the destination device or home gateway device may modify data packet parameters, such as the IP source and destination addresses as well as the Transmission Control Protocol (TCP) or User Datagram Protocol (UDP) source and destination ports for all data packets in the switched to stream to the original stream. However, other packet containers may also be spoofed, such as transport packet containers for data incoming over a satellite pathway. Thus, in various embodiments, this may correspond to matching, generating, or otherwise spoofing data containers for payloads incoming from a pathway that is switched to from an initial incoming data transfer pathway. Thus, the spoofed data packet container that repackages the payloads may appear to match those from the initial incoming stream, whether it be over a network pathway or a satellite pathway. This causes the media stream to appear to the destination device to originate from the original source address. The destination device or home gateway device may also have logic to perform packet matching and discarding of duplicate packets when the originating device transmits the media stream over both pathways, so that during switching, the media stream data packets may match and prevent gaps in stream output. Thus, the system may dynamically adjust the transfer mechanism of the stream based on cost with no interruption of the stream to the device displaying the media content at the user endpoint.

FIG. 1 is a block diagram of a communication transmission system 100 suitable for implementing the processes and features described herein, according to an embodiment. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. It is noted that sizes of various components and distances between these components are not drawn to scale in FIG. 1.

A central office 110, a destination device 120, and a TV 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of communication transmission system 100.

Central office 110 may be maintained, for example, by an originating source of media content, such as a broadcast television source, online media content host and associated media content database, and/or media generating entity including entities generating user generated content or otherwise sharing, broadcasting, or providing media content over one or more transmission pathways. Thus, central office 110 may provide media content over media streams to user endpoints through receiver devices (e.g., destination device 120) for output to display devices at the user endpoints (e.g., TV 130). In this regard, central office 110 includes one or more processing applications which may be configured to interact with destination device 120 and/or TV 130 to facilitate transmission of media content through a media stream over one or more transmission pathways.

Central office 110 may include a database or other volatile or non-volatile storage that may be utilized to store media content for transmission to one or more user endpoints. The stored media content may correspond to pre-generated media content, which may be transmitted to user endpoints on request. Such requests may be pre-scheduled, for example, programmed television viewing times and schedules, or may be transmitted on user request or demand for the media content, such as videos-on-demand (VODs). Central office 110 may also receive the media content for transmission from one or more live sources, for example, through a wired or wireless network pathway or over separate satellite transmissions on a separate satellite pathway. In such embodiments, central office 110 may then act as the facilitator in distribution of the live media content to user endpoints, which may be transmitted continuously and/or interspaced with prerecorded media content, such as commercials or other stored media content.

Central office 110 may distribute the media content over one or more media streams, which may require a transmission pathway for the media stream(s). For example, central office 110 may select and/or switch between transmission pathways, including a network transmission pathway utilizing network 140, a satellite transmission pathway using satellite 150, or other transmission pathway. Central office 110 may transmit the media content on request to destination device 110, which may cause playback of the media content on TV 130. In this regard, central office 110 may select the transmission pathway and/or switch between transmission pathways used to transmit media content to destination device 120 based on one or more factors, as discussed herein. Moreover, central office 110 may also transmit the media content over more than one transmission pathway to destination device 120 based on requirements for transmitting an uninterrupted media stream, for example, latency and/or packet loss issues during switching of transmission pathways.

Destination device 120 may correspond to a device in communication with central office 110 that may be used to provide the media content in a displayable format for TV 130. In various embodiments, destination device 120 may correspond to a receiver device configured to receive media stream signaling and convert the media stream to data displayable by TV 130. In this regard, destination device 120 may receive data in a media stream from central office 110 over one or more transmission pathways, and prepare the data for display through TV 130 or other suitable output device. Destination device 120 may include a network interface to communication with central office 110 over the media stream transmission pathway(s), or may communicate with another device at or nearby destination device 120 and/or TV 130 to receive media content after packet processing (e.g., unloading of packet payload and processing of the payload that formulates the media content, which may be done by a home gateway device such as a DIRECTV® HG1x® device). Destination device 120 may also receive requests for media content from one or more user endpoints, and transmit the requests to central office 110 for the purposes of establishing a media stream with central office 110 for the media content over one or more transmission pathways. Such requests may be directly input to destination device 120, or may be transmitted to destination device 120 from another device, such as TV 130.

In various embodiments, destination device 120 may include functionalities to perform matching of data packet parameters (e.g., a header and/or trailer for a data packet) for transmission of data packet payload as a continuous stream to TV 130 when switching between transmission pathways, as discussed herein. For example, when switching to a new transmission pathway, destination device 120 may remove the transport packet container for the new transmission pathway, unload data packet payload from the data packet containers received over the new transmission pathway and process them by adding, modifying, or otherwise repackaging the data payload into data packets that match the initial transmission pathway for the media stream, as discussed herein. However, in other embodiments, the processes and features to perform data packet matching of header and/or trailer metadata to original stream data packets when switching streams may be included in another device at or nearby destination device 120 and/or TV 130, such as the home gateway device. Additionally, destination device 120 and/or the home gateway device may have logic for packet matching and discarding of duplicate packet payloads when switching between transmission pathways. In various embodiments, TV 130 or other display device may include the processes and functions of destination device 120 so as to provide the processes and functions in a single device.

TV 130 may be implemented as a display device that may utilize appropriate hardware and software configured for wired and/or wireless communication with destination device 120 and/or over one or more media stream transmission pathways in order to receive media content over a media stream and display the media content to one or more users at the user endpoint association with TV 130. TV 130 may be utilized by one or more user endpoints to enter a request for media content, which may be transmitted to destination device 120 for transmission to central office 110. However, in other embodiments, the request may be entered directly to destination device 120.

In various embodiments, TV 130 may be implemented as television (e.g., a LCD, CRT, plasma, or other display device capable of outputting received audio, visual, or audiovisual data from a communication interface of TV 130). In such embodiments, TV 130 may require destination device 120 for the receipt of media content data from a media stream. However, in other embodiments, TV 130 may include a processing feature or correspond to a personal computer (PC), a smart phone, laptop/tablet computer, wristwatch with appropriate computer hardware resources, eyeglasses with appropriate computer hardware (e.g. GOGGLE GLASS®), other type of wearable computing device, implantable communication devices, and/or other types of computing devices capable of transmitting and/or receiving data. In such embodiments, TV 130 may include functionalities and processes of destination device 120 in order to receive and process a media stream to determine media content and output the media content through a display device. Although only one communication device is shown, a plurality of communication devices associated with destination device 120 may function similarly.

Central office 110 may therefore utilize one or more communication transmission pathways to transmit the media content as data in a media stream to destination device 120 for output through TV 130. Network 140 may be utilized to transmit the media stream over network 140 to destination device 120. Network 140 may be implemented as a single network or a combination of multiple networks. For example, in various embodiments, network 140 may include the Internet or one or more intranets, landline networks, wired or wireless networks, and/or other appropriate types of networks. Network 140 may correspond to small scale communication networks, such as a private or local area network, or a larger scale network, such as a wide area network or the Internet, accessible by the various components of communication transmission system 100. Media content may be transmitted through a media stream over a network pathway corresponding to network 140, as discussed in further reference to FIG. 2A.

A satellite 150 may be utilized to transmit the media stream to destination device 120. Satellite 150 may correspond to a satellite utilized in one or more satellite communication networks for the transmission of data. In this regard, satellite 150 may correspond to an artificial device in orbit around the Earth that may be utilized to relay communication signaling. In this regard, satellite 150 may relay and/or amplify received microwave and/or radio signals and act as a communication channel between a broadcasting satellite dish or uplink and a receiving satellite dish or downlink. Satellite 150 may receive signaling (e.g., the media content through a media stream) from central office 110 and rebroadcast the signaling to one or more receiving satellite downlink endpoints (e.g., satellite dishes) at or on the Earth for transmission to destination device 120. Thus, satellite 150 may be accessible by the various components of communication transmission system 100. Media content may be transmitted through a media stream over a satellite pathway corresponding to satellite 150, as discussed in further reference to FIG. 2B.

FIG. 2A is a block diagram of an exemplary network pathway for transmission of a media content stream from an originating source, according to an embodiment. In this regard, a network environment 200a displays a network transmission pathway for a media stream from central office 110, as discussed in reference to network 140 of FIG. 1. Network environment 200a includes central office 110, network 140, destination device 120, and TV 130 discussed in reference to communication transmission system 100 of FIG. 1.

Additionally, central office 110 is in communication with a network access point 142 adapted to communicate with network 140. In various embodiments, network access point 142 may comprise a DSL (e.g., Digital Subscriber Line) modem, a PSTN (Public Switched Telephone Network) modem, an Ethernet device, a broadband device, and/or various other types of wired and/or wireless network communication devices including microwave, radio frequency (RF), and infrared (IR) communication devices. Network access point 142 may also be associated with one or more devices for connection to a device associated with central office 110 to allow the device association with central office 110 to access network 140, such as a wired or wireless router (e.g., a WiFi router) capable of accessing network 140 through one of the aforementioned devices. Additionally, network access point 142 may also correspond to an LTE transceiver module for implementing an LTE physical layer and LTE protocol stack, and/or any other 3G, 4G, and/or 5G transceiver module(s), and/or other transceiver module(s) associated with other wireless protocols/applications. Network access point 142 may allow central office to transmit messages to and/or receive messages from destination device 120. Thus, network access point 142 may be used to receive requests for media content over network 140 and transmit media content in a media stream over network 140 (e.g., a network pathway) to destination device 120.

Network 140 may correspond to the Internet or one or more intranets, landline networks, wireless networks, and/or other appropriate types of networks. For example, network 150 may correspond to small scale communication networks, such as a private or local area network, or a larger scale network, such as a wide area network or the Internet. Network 140 may be accessible through wired and/or wireless technologies and devices, including DSL, PSTN, Ethernet, broadband, and/or other communication device. Network 140 may also be accessible through a cellular network, such as a 3G, 4G, 5G, and/or other 3GPP-based cellular networks, and/or a cellular network based on other cellular standards. Network 140 may be utilized to convey data between endpoints, including central office 110 and destination device 120/TV 130. In this regard, network 140 may be utilized as a network pathway for the transmission of a media stream from central office 110 to destination device 120.

A router 144 may be configured to interface with a wired or wireless network to access network 140. For example, router 144 may utilize an Ethernet interface, power-line modem, Digital Subscriber Line (DSL) modem, Public Switched Telephone Network (PSTN) modem, cable modem, and/or other appropriate components for wired communication with network 140. A wired link may be implemented with a power-line cable, coaxial cable, fiber-optic cable, or other cable or wires that support corresponding wired network technologies. In other embodiments, router 144 may wirelessly communicate with network 140 using wireless standards, such as the Institute of Electrical and Electronics Engineers (IEEE) 802.11 standard (e.g., WiFi), Bluetooth® standard, ZigBee® standard, and/or other wireless standards; cellular standards, such as 3G, 4G, 4G LTE, 5G, and/or other cellular standards; infrared-based communication; optical-based communications; and/or other appropriate communication standards and/or protocols. In some cases, router 144 and network 140 may be configured to communicate with each other using a proprietary wireless communication protocol and interface.

Router 144 may therefore be used as an access point for destination device 120 to access network 140. In this regard, destination device 120 may communicate requests for media content over network 140 to central office 110 using router 144 to transmit the request over network 140. Central office 110 may then receive the request through network access point 142. Central office 110 may respond to the request by determining a transmission pathway to transmit the media content to destination device 120. Where central office 110 selects a network pathway corresponding to network 140, central office 110 may transmit the media content in a media stream to destination device 120 over network 140. Thus, router 144 may receive the electronic signaling for the media stream from network 140. Router 144 may then process and convey the data to destination device 120 for output on TV 130. In various embodiments, the media stream may be encrypted by central office 110, which may be decrypted using destination device 120.

FIG. 2B is a block diagram of an exemplary satellite pathway for transmission of a media content stream from an originating source, according to an embodiment. In this regard, a satellite environment 200b displays a satellite transmission pathway for a media stream from central office 110, as discussed in reference to satellite 150 of FIG. 1. Satellite environment 200b includes central office 110, satellite 150, destination device 120, and TV 130 discussed in reference to communication transmission system 100 of FIG. 1.

Central office 110 is in communication with a satellite network transceiver device 152 adapted to communicate with satellite 150. In this regard, satellite network transceiver device 152 may be utilized to convey a media stream of media content through satellite 150 to a satellite network receiver device 158 for transmission to destination device 120 and output on TV 130. Satellite network transceiver device 152 may include at least an antenna configured to communicate through electromagnetic signals (e.g., radio and/or microwave frequency range signals) with an orbital satellite (e.g., satellite 150) placed in orbit around the Earth and acting as a relay or transponder device. Satellite network transceiver device 152 may correspond to a dish-shaped antenna, for example, using a parabolic reflector as a dish, that may direct signaling (e.g., the electromagnetic waves) for the media content to satellite 150. In various embodiments, satellite network transceiver device 152 may also receive communications or be associated with one or more devices or transmission pathways to receive communications, for example, a request from destination device 120 for media content to be streamed to destination device 120. Thus, central office 110 may utilize satellite network transceiver device 152 for the transmission of data (e.g., media streams of media content) using satellite 150 to one or more user endpoints.

Satellite 150 may correspond to an orbital communication device in orbit around the Earth that may be utilized to relay communication signaling. Satellite 150 may utilize radio and/or microwaves, which may be received by satellite 150 and/or transmitted by satellite 150. Satellite 150 may amplify and rebroadcast a satellite uplink 154, through transponders located on satellite 140, as a satellite downlink 156. Depending on satellite 150 antenna patterns, satellite downlink 156 is directed towards geographic areas for reception by a satellite network receiver device 158. Satellite 150 typically communications in the Ku-band (e.g., 12-18

Ghz portion of the microwave range of frequencies) but may also operate in Ka band (e.g., 26.5-40 Ghz portion of the microwave range of frequencies). Bandwidth within these frequencies may be licensed and/or provided for one or more broadcaster, including central office 110, for transmission of media content over a media stream. Satellite uplink 154 and satellite downlink 156 may be assigned different frequency bands so as to avoid interference during transmission of a media stream using the satellite pathway.

Environment 200b is further illustrated having satellite network receiver device 158 in communication with destination device 120. Satellite network receiver device 158 may receive the satellite signals from satellite 150 through one or more antennas and convert them into audio and video files for playback on TV 130 and/or transmission to destination device 120 for storage or use. Satellite network receiver device 158 may include at least an antenna configured to communicate through electromagnetic signals (e.g., radio and/or microwave frequency range signals) with a satellite (e.g., satellite 150) placed in orbit around the Earth and acting as a relay or transponder device. Satellite network receiver device 158 may correspond to a dish-shaped antenna, for example, using a parabolic reflector as a dish, that may receive signaling (e.g., the electromagnetic waves) for the media content from satellite 150 and convey the data to destination device 120. Thus, satellite network receiver device 158 may receive electromagnetic signaling that corresponds to the media stream of the media content and provides data corresponding to the signaling to destination device 120 for use and/or output.

Satellite network receiver device 158 may therefore be used as an access point for destination device 120 to receive and access data transmitted by satellite 150. In this regard, destination device 120 may communicate requests for media content to central office 110. Central office 110 may then receive the request and respond to the request by determining a transmission pathway to transmit the media content to destination device 120. Where central office 110 selects a satellite pathway corresponding to satellite 150, central office 110 may transmit the media content in a media stream to destination device 120 through satellite 150, for example, on satellite uplink 154 from satellite network transceiver device 152 to satellite network receiver device 158 on satellite downlink 156. Thus, satellite network receiver device 158 may receive the electronic signaling for the media stream from satellite 150. Satellite network receiver device 158 may then process and convey the data to destination device 120 for output on TV 130. In various embodiments, the media stream may be encrypted by central office 110, which may be decrypted using destination device 120.

Figure 3:
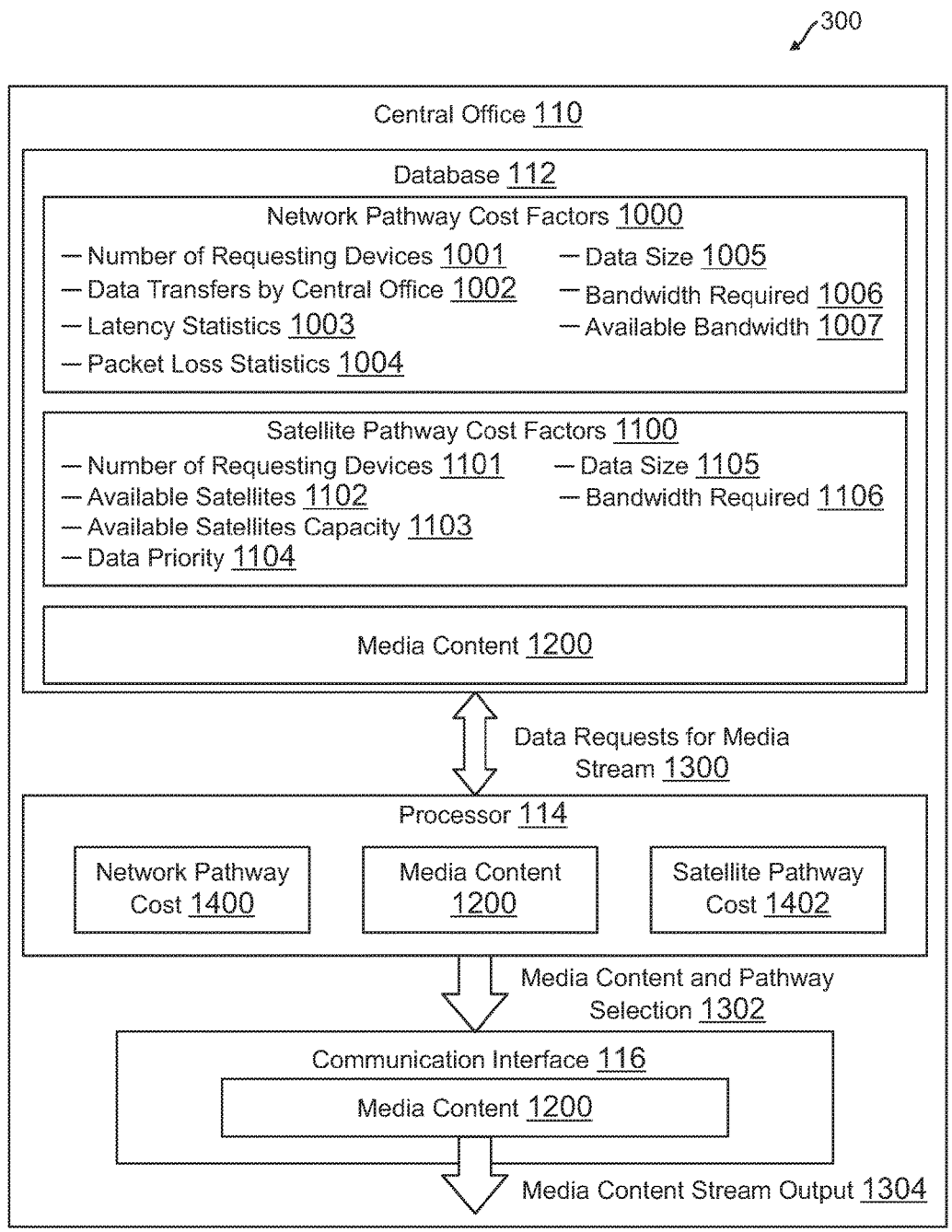
FIG. 3 is a block diagram of an originating source structure for determining and switching pathways for transmission of a media content stream, according to an embodiment.

FIG. 3 is a block diagram of an originating source structure 300 for determining and switching pathways for transmission of a media content stream, according to an embodiment. Originating source structure 300 may correspond to the originating source of a media content, which may be transmitted over a media stream to one or more user endpoints for playback. In this regard, originating source structure 300 may determine a transmission pathway for the media stream, and may switch between two or more transmission pathways based on cost, scoring, efficiency, or other analysis metrics. Originating source structure 300 includes central office 110 discussed in reference to communication transmission system 100 of FIG. 1.

Central office 110 includes a database 112 that corresponds to a volatile and/or non-volatile storage for one or more data structures, including factors utilized to determine a transmission pathway for a media stream and/or media content for the media stream. For example, volatile memory and/or storage for database 112 may include synchronous dynamic random access memory (SDRAM), dynamic RAM (DRAM), static RAM (SRAM) Rambus dynamic RAM (RDRAM), and/or other types of volatile memory. Non-volatile memory and/or storage for database 112 may include read-only memory (ROM), programmable ROM (PROM), erasable programmable ROM (EPROM), electrically erasable programmable (EEPROM), flash memory, non-volatile RAM (NVRAM), and/or other types of non-volatile memory. Additionally, database 112 may be stored to one or more other types of machine-readable storage types and/or media, including floppy disk, flexible disk, hard disk, magnetic tape, any other magnetic medium, CD-ROM, any other optical medium, punch cards, paper tape, any other physical medium.

Database 112 is shown with network pathway cost factors 1000, satellite pathway cost factors 1100, and media content 1200. Media content 1200 may correspond to a single type of media content or multiple different types of media content, including audio, visual, and/or audiovisual data. For example, media content may include radio broadcasts, music, images, videos, and other type of content that a user may wish to view, hear, or otherwise consume. Media content 1200 may be stored from early production, for example, in the case of prerecorded television, movies, and the like, or may be live video that is transmitted to central office 110 for transmission to user endpoints. In such embodiments, media content 1200 as live video may not be stored to database 112 and instead reproduced by processor 114 as necessary for media streams, or may be quickly cached in database 112 for reproduction and transmission to user endpoints in media streams.

Network pathway cost factors 1000 may correspond to available and/or stored data associated with a cost, score, efficiency, or other metric for measuring and/or quantifying whether central office 110 should transmit data over a network pathway, for example, a media stream of media content. For example, network pathway cost factors 1000 may be processed and compared to cost factors for another pathway (e.g., satellite pathway cost factors 1100) to determine whether to transmit the data over the network pathway or the other pathway (e.g., the satellite pathway). Network pathway cost factors 1000 may each be weighed equally in determining the cost, score, or other metric for transmission of the data on the network pathway. However, in other embodiments, network pathway cost factors 1000 may be weighed unevenly, or different factors may be given greater or lesser weight, as determined by central office 110 for consideration of costs, efficiencies, resource usage, and similar requirements. Network pathway cost factors 1000 may include factors shown in FIG. 3, for example, a number of requesting devices 1001 for a media content and/or other media content, data transfers 1002 by central office 110 including data transfers over the network pathway and/or satellite pathway, latency statistics 1003 for the network pathway, packet loss statistics 1004 for the network pathway, data size 1005 of the media content, bandwidth required 1006 for transmission and/or streaming of the media content (including based on the requesting device and requesting devices resolution, frame rate, etc.), and available bandwidth 1007 on the network pathway. Processor 114 may then process one or more of these factors to determine a cost, score, or other metric for transmission on the network pathway, as discussed herein.

Satellite pathway cost factors 1100 may correspond to available and/or stored data associated with a cost, score, efficiency, or other metric for measuring and/or quantifying whether central office 110 should transmit data over a satellite pathway, for example, a media stream of media content. For example, satellite pathway cost factors 1100 may be processed and compared to cost factors for another pathway (e.g., network pathway cost factors 1000) to determine whether to transmit the data over the satellite pathway or the other pathway (e.g., the network pathway). Satellite pathway cost factors 1100 may each be weighed equally in determining the cost, score, or other metric for transmission of the data on the satellite pathway. However, in other embodiments, satellite pathway cost factors 1100 may be weighed unevenly, or different factors may be given greater or lesser weight, as determined by central office 110 for consideration of costs, efficiencies, resource usage, and similar requirements. Satellite pathway cost factors 1100 may include factors shown in FIG. 3, for example, a number of requesting devices 1101 for a media content and/or other media content (which may correspond to and/or be the same as the number of requesting devices 1001 in network pathway cost factors), available satellites 1102 for transmission and relaying of a media content to one or more user endpoints, available satellite capacity 1103 for the available satellites 1102 that may be used to transmit/relay the information to endpoints (e.g., bandwidth availability and data transfer capacity limits and availability, such as megabits or gigabits per second available), data priority 1004 for the media content when transmitting on available satellites 1102 over other data and/or media streams, data size 1105 of the media content (which may correspond and/or be the same as data size 1005 for network pathway cost factors 1000), and/or bandwidth required 1106 for transmission and/or streaming of the media content (including based on the requesting device and requesting devices resolution, frame rate, etc., which may correspond and/or be the same as data size 1005 for network pathway cost factors 1000). Processor 114 may then process one or more of these factors to determine a cost, score, or other metric for transmission on the satellite pathway, as discussed herein.

Central office 110 further includes a processor 114, which may correspond to a micro-controller, digital signal processor (DSP), or other processing component, which may process received signals and/or stored data in order to determine media content for a media content stream and transmit the media content using a communication interface 116 to one or more endpoints over one or more transmission pathways. In this regard, processor 114 may process data requests for media stream 1300 in order to retrieve data required for streaming media content to one or more user endpoints based on selection of one or more transmission pathways. Data requests for media stream 1300 may cause network pathway cost factors 1000 to be accessed from database 112 by processor 114 to determine network pathway cost 1400, which may correspond to a measurement of efficiency, monetary cost, resource usage, or other quantifying measurement of value loss or gain to central office 110 by transmitting media content 1200 over the network pathway associated with network pathway cost 1400. Similarly, data requests for media stream 1300 may cause satellite pathway cost factors 1100 to be accessed from database 112 by processor 114 to determine satellite pathway cost 1402, which may correspond to a measurement of efficiency, monetary cost, resource usage, or other quantifying measurement of value loss or gain to central office 110 by transmitting media content 1200 over the satellite pathway associated with satellite pathway cost 1402. As previously discussed, the factors utilized by processor 114 to determine network pathway cost 1400 and/or satellite pathway cost 1402 may be weighed equally or assigned different weights based on system requirements and/or cost and value evaluations.

Moreover, processor 114 may access media content 1200 for transmission on one or more of the network pathway and/or the satellite pathway to the user endpoint(s) requesting media content 1200. Processor 114 may compare network pathway cost 1400 and satellite pathway cost 1402 to determine a lowest cost or most beneficial cost, value, or score to central office 110. The most beneficial metric of network pathway cost 1400 and satellite pathway cost 1402 may correspond to the selected pathway for transmission of a media stream to user endpoints. For example, if it is more beneficial to transmit the media stream on the network pathway based on network pathway cost 1400 being lower, better, or more beneficial to central office 110 than satellite pathway cost 1402, processor 114 may select the network pathway. Conversely, the satellite pathway may be selected when network pathway cost 1400 is worse, higher, or less beneficial to central office 110 than satellite pathway cost 1402.

Once the transmission pathway is selected, media content and pathway selection 1302 may be output to communication interface 116. Communication interface 116 may then receive media content 1200 as well as the transmission pathway selection. Communication interface 116 may then provide media content stream output 1304 using the selected transmission pathway, which may be received by user endpoints.

In various embodiments, processor 114 may continue to calculate network pathway cost 1400 and satellite pathway cost 1402 during transmission of media content through media content stream output 1304. In this regard, network pathway cost factors 1000 and/or satellite pathway cost factors 1100 may be updated, for example, in real-time depending on changing factors and parameters (e.g., number of requesting devices 1001/1101, data transfers by central office 1002, latency statistics 1003, packet loss statistics 1004, available satellites 1102, available satellite capacity 1103, data priority 1004, data size 1005/1105 of the media content, bandwidth required 1006/1106, and/or available bandwidth 1007). For example, central office 110 may receive data that changes network pathway cost factors 1000 and/or satellite pathway cost factors 1100. Based on these changes, network pathway cost 1400 and/or satellite pathway cost 1402 may change. Thus, processor 114 may continuously, intermittently, and/or periodically change, update, determine, or calculate network pathway cost factors 1000 and/or satellite pathway cost factors 1100.

During updating and/or recalculation of network pathway cost factors 1000 and/or satellite pathway cost factors 1100 by processor 114, it may become more beneficial to central office 110 to switch transmission pathways, for example, to end transmission of media content 1200 in media content stream output 1304 over the initially selected transmission pathway, and instead transmit media content 1200 in media content stream output 1304 over another pathway. Thus, processor 114 may update network pathway cost factors 1000 and/or satellite pathway cost factors 1100 to determine what the most beneficial transmission pathway is at all or various time points or intervals. Processor 114 may continue to compare network pathway cost factors 1000 and satellite pathway cost factors 1100 to determine the most beneficial network pathway, and where the selected network pathway no longer is the most beneficial to central office 110 (e.g., has a higher cost or otherwise is more detrimental to cost, value, resource usage, or efficiency), processor 114 may elect to switch to a more beneficial transmission pathway. For example, where the network pathway is initially selected based on only a few requesting devices, but the number of requesting devices increases, it may become more beneficial to transmit media content 1200 over the satellite pathway based on updating and/or recalculating network pathway cost factors 1000 and/or satellite pathway cost factors 1100. There may further be an additional factor to consider when considering whether to switch between the network pathway and the satellite pathway based on updates to network pathway cost factors 1000 and/or satellite pathway cost factors 1100, for example, a cost, resource usage, or other value loss associated with switching between the two pathways, for example, additional resource usage to cause the switch, during the switch, or after the switch to prevent stream interruption, data loss, and/or lag.

Where processor 114 determines that a switch between the network transmission pathway and the satellite transmission pathway should be effected based on updates to network pathway cost factors 1000 and/or satellite pathway cost factors 1100 during media content stream output 1304 by central office 110, processor 114 may effectuate that switch by communicating with communication interface 116 to instruct communication interface 116 to switch media content stream output 1304 to the newly selected transmission pathway. Communication interface 116 may then end media content stream output 1304 over the initially selected transmission pathway, and may continue media content stream output 1304 over the newly selected transmission pathway. However, in order to prevent interruption due to latency issues, packet loss, and/or switching, processor 114 and/or communication interface 116 may continue media content stream output 1304 over the initially selected transmission pathway for a limited time in addition to transmitting media content 1200 in media content stream output 1304 over the newly selected transmission pathway. Thus, media content 1200 may be transmitted over multiple pathways (e.g., the network pathway and the satellite pathway) for a period of time for redundancy to prevent interruption of the stream while a downstream device resolves the switching of the network pathways for the media stream of media content 1200. The process for resolution of pathway switching at or nearby the user endpoint is discussed in reference to FIG. 4 below. The time that media content 1200 may be streamed over both or multiple channels may be preset, or may be based on network and/or satellite information, for example, network latency/packet loss, data transmission distance, satellite capacity and/or usage, etc. Additionally, processor 114 may switch transmission of media content stream output 1304 multiple times through use of the processes described above.

Figure 4:
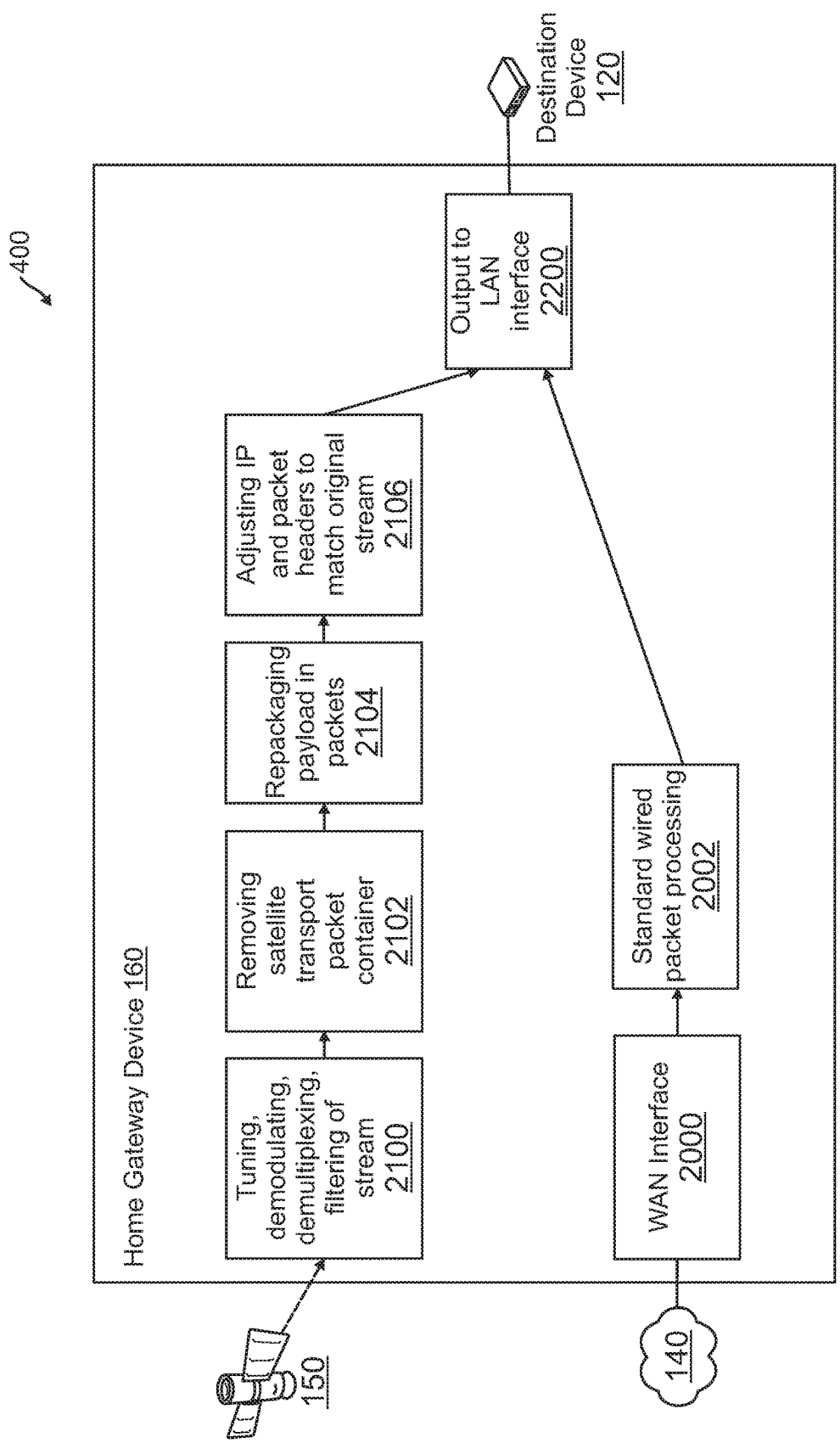
FIG. 4 is a block diagram of a home gateway device environment for unpacking and delivering a media content stream transmitted over multiple delivery pathways, according to an embodiment.

FIG. 4 is a block diagram of a home gateway device environment 400 for unpacking and delivering a media content stream transmitted over multiple delivery pathways, according to an embodiment. Home gateway device environment 400 is shown where home gateway device 160 receives a media stream originally from network 140 over a network pathway, and a central office switches transmission of the media stream to a satellite pathway using satellite 150. Thus, home gateway device 160 is required to resolve switching and changes in stream transmission pathway to prevent interruption of the media stream and provide a continuous media stream for seamless output to user endpoints. Home gateway device environment 400 is shown with destination device 120, network 140, and satellite 150 discussed in reference to communication transmission system 100 of FIG. 1.

Initially, home gateway device 160 receives communications from network 140 using a wide area network (WAN) interface 2000. In such embodiments, communications received from network 140 may correspond to an initial media stream of media content that is received by WAN interface 2000 of home gateway device 150. Home gateway device 160 may then perform standard packet processing at 2002, for example, data packet payload processing to process and confirm the media data stream of the media content. Once processed, the media content data may be output to a local area network (LAN) interface 2200 and transmitted to destination device 120 for playback and output using a display device, such as a television, computing system, or other output device.

During transmission of the media stream to home gateway device 160, a central office or other originating source of the media stream may switch transmission of the media stream from a network pathway using network 140 to a satellite pathway using satellite 150. In this regard, home gateway device 160 may instead begin to receive the media stream from satellite 150. In order to prevent stream interruptions based on receiving the media stream over another pathway (e.g., where the media stream data parameters and metadata do not match up, causing interruption and de-synchronization of data to destination device 120), home gateway device 160 may employ one or more processes using data received over the satellite pathway from satellite 150. For example, home gateway device 160 may first perform any tuning, demodulating, demultiplexing, and/or filtering as needed of the media stream at 2100 in order to receive the satellite transport packet container for the data packets of the media stream. At 2102, home gateway device 160 may then remove the satellite transport packet container for the data packets to obtain the data packets constituting the media stream transmitted over the satellite pathway.

However, the data packets transmitted over the satellite pathway may appear to differ in origination due to the difference in data packet header and/or packet footer, when compared against the data packets transmitted over the network pathway. Thus, at 2104, payloads of the data packets are repackaged into different packets, such as Transmission Control Protocol (TCP) or User Datagram Protocol (UDP) packets that would match network traffic packets received from network 140 over a network pathway. For example, the network pathway may be switched to the satellite pathway so that the data incoming from satellite 140 may be required to match data transport packet containers from the network pathway. In such embodiments, the data may initially come from the network pathway over network 140, or may be switch back to the satellite pathway incoming from satellite 150 after transfer over network 140. In such embodiments, destination device 120 may expect incoming data to be transferred over network 140, and therefore include data packet containers and additional metadata that matches transfer of data over network 140. For example, network 140 may utilize Transmission Control Protocol (TCP) as the protocol governing delivery of data over network 140 to home gateway device 160 and/or destination device 120. To convert data being transferred via satellite 150 to network 140 using TCP, a process at 2004 may take the payload for the data incoming from satellite 150 (e.g., by extracting the data from the data containers of the data stream from satellite 150) and repackage or wrap it into a TCP packet spoofing (e.g., spoofed TCP packet containers, or other spoofed packet containers such as UDP packet containers) to appear that these packets are from the original source over network 140. In various embodiments, additional logic might also be needed if there are higher layer transfer protocols involved such as the HLS or MPEG-DASH. Moreover, any meta-functions such as retrieval of the playlist may also be processed by home gateway device 160 at 2106.

Thus, the payload in the spoofed packets appears as network transmitted packets. In order to further match packets received over network 140, at 2106, home gateway device 160 further adjusts the IP and TCP/UDP headers of the data packets to match the original stream. For example, the IP source for the data packets may be modified to mimic the original stream received over network 140, as well as the destination addresses. Similarly, the TCP/UDP source and destination ports for the data packets may also be modified to mimic the original source transmitted on the network pathway over network 140. In other embodiments, the spoofed data packet containers, headers, and/or other information may correspond to other types of data packet containers and information that may match a different origination source/stream than network 140. For example, satellite 150 may correspond to the origination source/stream for the data. Therefore, transport packet container spoofing for data that is switched to transfer over network 140 (e.g., from originally incoming from satellite 15) may be required to unpack data incoming over network 140 by removing the data from the data containers and spoofing data containers by home gateway device 160 to match those data container to data incoming over satellite 150.

Once the data packets mimic the original source of the media stream, the data packets may be output to LAN interface 2200, which may transmit the data to destination device 120 for playback and output using a display device, such as a television, computing system, or other output device. Thus, the stream may be uninterrupted through mimicking of data packet metadata for data payloads to data received over the network pathway when the data payloads are received over the satellite pathway after switching from the network pathway. Similarly, where the satellite pathway acts as the originating media stream and the network pathway acts as the second pathway that is switched to by the originating source, a process similar to above, mimicking data packet metadata for payloads received over the network pathway to the satellite pathway, may be performed.

Figure 5:
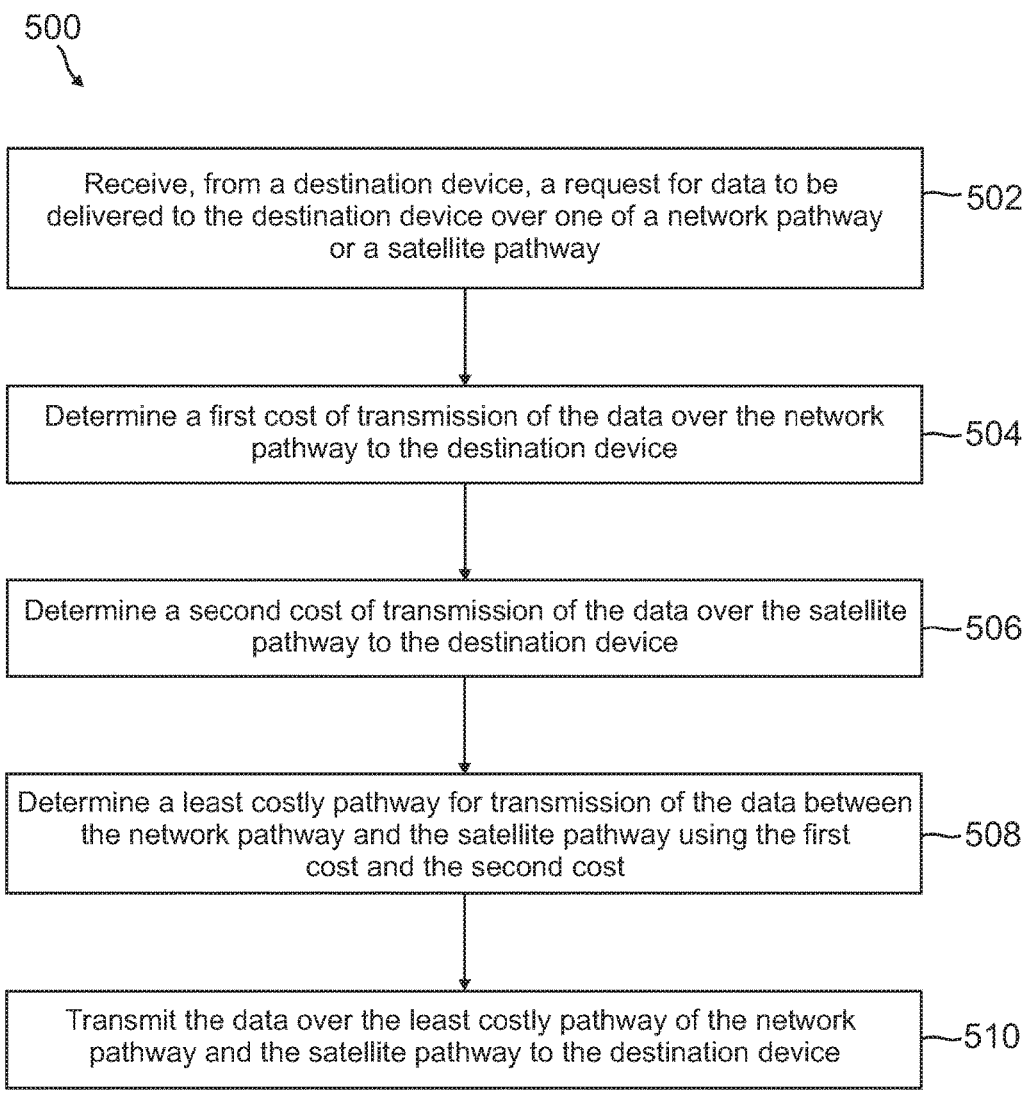
FIG. 5 is an exemplary process flowchart for a hybrid media stream delivery using multiple network connections, according to an embodiment.

FIG. 5 is an exemplary process flowchart 500 for a hybrid media stream delivery using multiple network connections, according to an embodiment. Note that one or more steps, processes, and methods described herein may be omitted, performed in a different sequence, or combined as desired or appropriate.

At step 502 of flowchart 500, a request is received from a destination device for data to be delivered to the destination device over one of a network pathway or a satellite pathway. The data may comprise media source content for a unicast stream to the destination device for playback to one or more users on the destination device. At step 504, a first cost of transmission of the data over the network pathway to the destination device is determined. The first cost may be determined using at least one of a number of pathway cost factors. Pathway cost factors can be destination devices requesting the data, an amount of data transferred by a central office transmitting the data over the network pathway, latency statistics for the network pathway, packet loss statistics for transmission on the network pathway, size of the data, or the bandwidth required for transmission of the data. At step 506, a second cost of transmission of the data over the satellite pathway to the destination device is determined. The second cost may be determined using at least one of a number of pathway cost factors, described above.

At step 508, a least costly pathway for transmission of the data between the network pathway and the satellite pathway is determined using the first cost and the second cost. In one embodiment, if the cost difference exceeds a predetermined threshold, the pathway is switched. Note that it may not always be advantageous to switch pathways due to possible issues resulting from the switch. As a result, only differences that exceed a threshold may trigger a switch. At step 510, the data is transmitted over the least costly pathway of the network pathway and the satellite pathway to the destination device. Transmitting the data over the least costly pathway may comprise transmitting the data over the satellite pathway to a network node closer to the destination device and causing the data to be transmitted from the network node to the destination device over a network associated with the network pathway. In further embodiments, updates to at least one of the first cost or the second cost may be received, wherein the updates change the at least one of the first cost or the second cost. In response, a change to the least costly pathway for transmission of the data between the network pathway or the satellite pathway may be determined using the updates, and it may further be switched between the network pathway and the satellite pathway based on the change.

A device associated with the destination device may receive the data, wherein the device passes the data unimpeded to the destination device when the data is received over the network pathway, and wherein the device removes the data from at least one transport packet container and matches sender header information for the data to the data received over the network pathway during passing of the data to the destination device when the data is received over the satellite pathway. The sender header information may be matched to the data received over the network pathway by matching at least one of an IP source address, an IP destination address, a User Datagram Protocol (UDP) source address, a Transmission Control Protocol (TCP) source address, or a destination port identifier. The device may further perform packet matching and discarding of additional packets during passing of the data to the destination device when switching between the network pathway and the satellite pathway. The device may comprise a home gateway device connected to the destination device at a location for the destination device.

Figure 6:
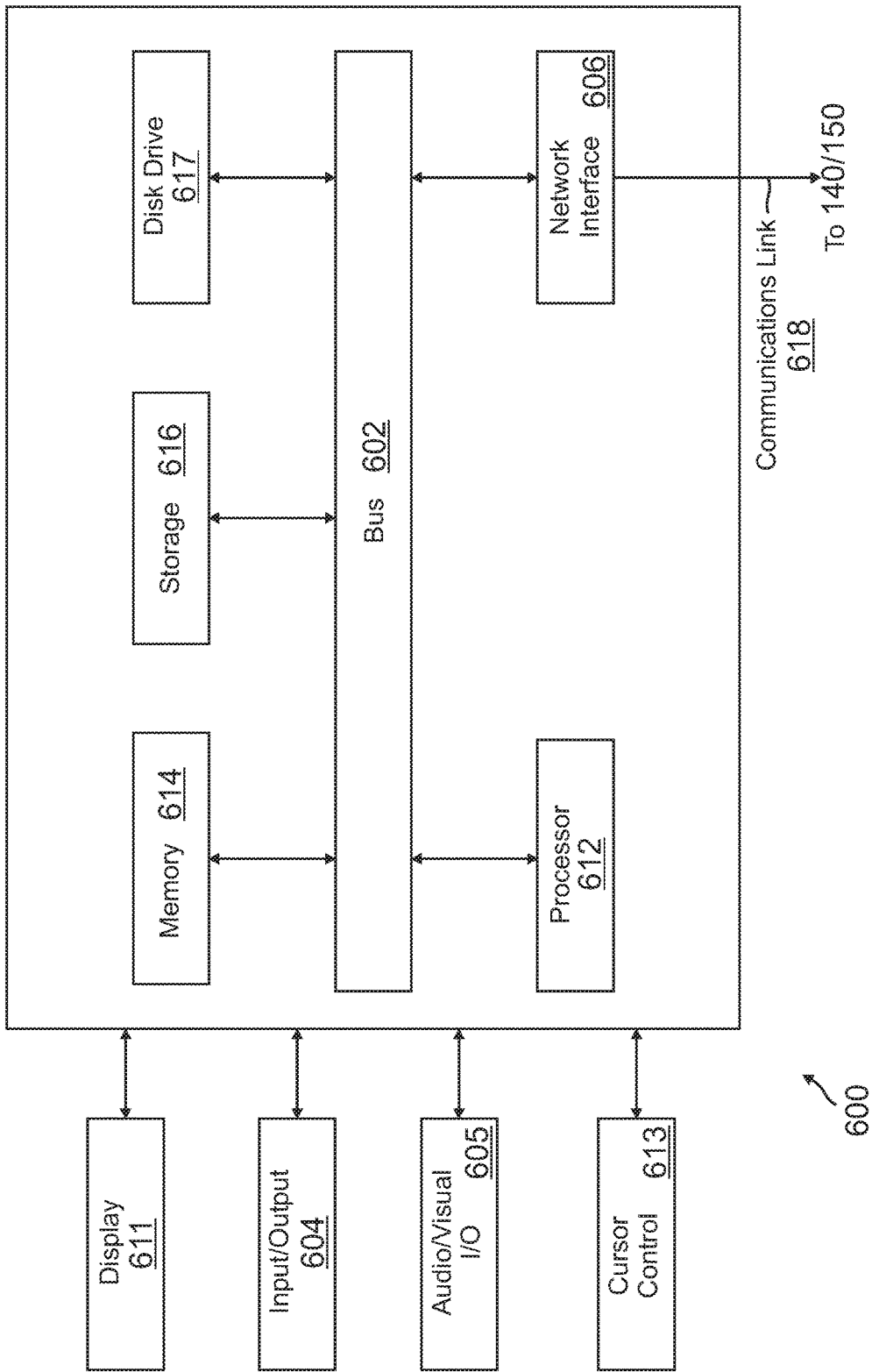
FIG. 6 is a block diagram of a computer system suitable for implementing one or more components in FIG. 1, according to an embodiment.

FIG. 6 is a block diagram of a computer system suitable for implementing one or more components in FIG. 1, according to an embodiment. In various embodiments, the system of computer system 600 may correspond to one or more devices or servers of central office 110, destination device 120, TV 130, and/or home gateway device 160, and may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio input/output component 605 may also be included to allow a user to use voice for inputting information by converting audio signals. Audio I/O component 605 may allow the user to hear audio. A transceiver or network interface 606 transmits and receives signals between computer system 600 and other devices, such as another communication device, service device, or a service provider server via network 140/satellite 150. In various embodiments, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In various embodiments, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
receiving, from a destination device, a request for data to be delivered to the destination device over one of a network pathway or a satellite pathway;
determining a first cost of transmission of the data over the network pathway to the destination device;
determining a second cost of transmission of the data over the satellite pathway to the destination device;
determining a least costly pathway for transmission of the data between the network pathway and the satellite pathway using the first cost and the second cost; and
transmitting the data over the least costly pathway of the network pathway and the satellite pathway to a device associated with the destination device, wherein the data is passed directly by the device to the destination device when the data is transmitted over the network pathway, and wherein the data is removed from at least one first transport packet container, added to at least one second transport packet container associated with transport packet containers received over the network pathway, and passed to the destination device in the at least one second transport packet container by the device when the data is transmitted over the satellite pathway.

2. The method of claim 1, further comprising:
receiving updates to at least one of the first cost or the second cost, wherein the updates change the at least one of the first cost or the second cost;
determining a change to the least costly pathway for transmission of the data between the network pathway or the satellite pathway using the updates; and
switching between the network pathway and the satellite pathway based on the change.

3. The method of claim 2, wherein the device further performs packet matching and discarding of additional packets during passing of the data to the destination device when switching between the network pathway and the satellite pathway.

4. The method of claim 3, wherein the device comprises a home gateway device connected to the destination device at a location for the destination device.

5. The method of claim 1, wherein sender header information of the at least one second transport packet container matched to the at least one first transport packet container for the data received over the network pathway comprises at least one of an IP source address, an IP destination address, a User Datagram Protocol (UDP) source address, a Transmission Control Protocol (TCP) source address, or a destination port identifier.

6. The method of claim 1, wherein the first cost is determined using at least one of a number of destination devices requesting the data, an amount of data transferred by a central office transmitting the data over the network pathway, latency statistics for the network pathway, packet loss statistics for transmission on the network pathway, size of the data, or bandwidth required for transmission of the data.

7. The method of claim 1, wherein the second cost is determined using at least one of a number of destination devices requesting the data, available satellites for transmission on the satellite pathway, available satellite capacity for the satellite pathway, priority of the data on the satellite pathway, size of the data, or bandwidth required for transmission of the data.

8. The method of claim 1, wherein the transmitting the data over the least costly pathway comprises transmitting the data over the satellite pathway to a network node closer to the destination device and causing the data to be transmitted from the network node to the destination device over a network associated with the network pathway.

9. The method of claim 1, wherein the data comprises media source content for a unicast stream to the destination device for playback to one or more users on the destination device.

10. The method of claim 1, wherein the at least one second transport packet container spoofs the transport packet containers received over the network pathway, and wherein the at least one second transport packet containers repackages the data in data stream matching the transport packet containers received over the network pathway.

11. A system comprising:
a non-transitory memory; and
one or more hardware processors coupled to the non-transitory memory and configured to read instructions from the non-transitory memory to cause the system to perform operations comprising:
determining a first score for transmission of media content over a network pathway to a destination device by a central office;
determining a second score for transmission of the media content over a satellite pathway to the destination device;
comparing the first score to the second score for transmission of the media content over one of the network pathway or the satellite pathway; and
transmitting the media content over the one of the network pathway or the satellite pathway a device connected to the destination device based on the comparing wherein the device directly passes the media content to the destination device when the media content is received over the network pathway, and wherein the device retrieves data packet payloads for the media content from at least one data container in a unicast media stream and changes sender header information for the data packet payloads during passing of the media content by the device to the destination device when the media content is received over the satellite pathway.

12. The system of claim 11, wherein the operations further comprise:
receiving at least one update to at least one of the first score or the second score, wherein the at least one update changes the at least one of the first score or the second score; and
switching between the network pathway or the satellite pathway based on the at least one update.

13. The system of claim 11, wherein the sender header information changed by the device comprises at least one of an IP source address, an IP destination address, a User Datagram Protocol (UDP) source address, a Transmission Control Protocol (TCP) source address, or a destination port.

14. The system of claim 11, wherein the device further performs packet matching and discarding of additional packets during passing of the media content to the destination device when switching between the network pathway and the satellite pathway.

15. The system of claim 11, wherein the sender header information is changed to spoof a media stream of the media content received over the network pathway.

16. A non-transitory machine-readable medium having stored thereon machine-readable instructions executable to cause a machine to perform operations comprising:
receiving, from at least one destination device, a media content display request for media content;
determining a first cost of transmission of the media content over a network pathway to the at least one destination device;
determining a second cost of transmission of the media content over a satellite pathway to the at least one destination device;
determining a lowest cost for transmission of the media content to the at least one destination device over one of the network pathway or the satellite pathway using the first cost and the second cost; and
transmitting the media content over the lowest cost for transmission over the one of the network pathway or the satellite pathway to a device associated with the destination device, wherein, when the media content is transmitted over the satellite pathway, the media content is accessed from at least one data container and sender header information is modified for the media content when the device passes the media content to the destination device.

17. The non-transitory machine-readable medium of claim 16, wherein the operations further comprise:
receiving updates to at least one of the first cost and the second cost, wherein the updates change the at least one of the first cost and the second cost;
updating the lowest cost based on the updates; and
switching between the network pathway and the satellite pathway based on the updating the lowest cost.

18. The non-transitory machine-readable medium of claim 16, wherein the sender header information modified by the device comprises at least one of an IP source address, an IP destination address, a User Datagram Protocol (UDP) source address, a Transmission Control Protocol (TCP) source address, or a destination port.

19. The non-transitory machine-readable medium of claim 16, wherein the device further performs packet matching and discarding of additional packets during passing of the media content to the destination device when switching between the network pathway and the satellite pathway.

20. The non-transitory machine-readable medium of claim 16, wherein the sender header information is modified to mimic a stream of the media content received over the network pathway.

\* \* \* \* \*